United States Patent [19]

Funston

[11] Patent Number: 5,067,020
[45] Date of Patent: Nov. 19, 1991

[54] DUAL SENSOR FILM SCANNER HAVING COUPLED OPTICS AND A VIDEO VIEWFINDER

[75] Inventor: David L. Funston, Batavia, N.Y.

[73] Assignee: Eastman Kodak Company, Rochester, N.Y.

[21] Appl. No.: 450,762

[22] Filed: Dec. 14, 1989

[51] Int. Cl.$^5$ .................. H04N 5/253; H04N 3/36
[52] U.S. Cl. .................. 358/214; 358/212; 358/215; 358/225
[58] Field of Search ............ 358/212, 214, 215, 216, 358/97, 140, 311, 185, 244, 228, 120, 54, 50, 43, 451, 225, 475

[56] References Cited

U.S. PATENT DOCUMENTS

| | | | |
|---|---|---|---|
| Re. 32,137 | 5/1986 | Lianza | 250/578 |
| 3,672,593 | 6/1972 | Knowles et al. | 242/67.4 |
| 3,720,462 | 3/1973 | Dali et al. | 353/27 |
| 3,720,463 | 3/1973 | Taylor | 353/27 |
| 3,784,135 | 1/1974 | Owen | 248/11 |
| 3,835,247 | 9/1974 | Soamers | 358/93 |
| 4,121,245 | 10/1978 | Hibbard | 358/102 |
| 4,349,836 | 9/1982 | Sawano | 358/102 |
| 4,485,406 | 11/1984 | Brownstein | 358/227 |
| 4,496,981 | 1/1985 | Ota | 358/213 |
| 4,541,010 | 9/1985 | Alston | 358/44 |
| 4,589,029 | 5/1986 | Torimaru et al. | 358/224 |
| 4,700,237 | 10/1987 | Yoshioda et al. | 358/287 |
| 4,769,699 | 9/1988 | Gebauer et al. | 358/97 |
| 4,777,525 | 10/1988 | Preston | 358/102 |
| 4,922,335 | 5/1990 | Outa et al. | 358/80 |
| 4,928,171 | 5/1990 | Kline | 358/97 |

Primary Examiner—Tommy P. Chin
Assistant Examiner—Tuan V. Ho
Attorney, Agent, or Firm—Dennis R. Arndt

[57] ABSTRACT

A film image retrieval and scanning apparatus having split first and second optical paths with each optical path being precisely aligned with the other, and each path containing coupled zoom optics. The first path projects a film image onto a first scanner array in the first path to provide a real time display of the image on a TV monitor. The second optical path projects an image onto a second scanner array, which may have a higher resolution than the first array to provide an analog signal that is converted to a digital signal of the image that may be stored, or transmitted on a network, or both. The first scanner provides a real time image and serves as a viewfinder that can be used to locate the proper position of an image; thus ensuring that the image will be aligned with the second array so that it can be scanned by the second scanner array when desired.

9 Claims, 2 Drawing Sheets

DUAL SENSOR FILM SCANNER HAVING COUPLED OPTICS AND A VIDEO VIEWFINDER

TECHNICAL FIELD

The invention relates to an electronic scanner imager, and more particularly to the scanning of images stored on microfilm.

BACKGROUND ART

Microfilm readers are now available that both optically display the information contained in a frame of microfilm and also electronically scan the same image. The electronically scanned information may be used on a network to provide a remote image on a display or the information may be stored or used to make a hard copy of the image using some type of a printer. Because the image resolution required for the scanned image is high, a scanner, typically a linear sensor array is used to convert the image line by line, into an electrical output. During the scanning operation, the optically displayed image is usually blanked. Reference is made to U.S. Pat. No. RE 32,137, which describes a method to scan microfilm using a linear sensor.

Accurate reproduction of a scanned image requires that the image be optimal during scanning. Optimzation may include such functions as exposure control, focus, as well as image positioning. Currently, this requires several scans with the linear sensor to provide the required optimization. The time required for pre-scanning each image reduces productivity so in an effort to speed the printing operation the operator assumes that all the images in a group, share common exposure characteristics requiring only one pre-scan for the entire group; such a practice can compromise the quality of some of the images.

Microfilm retrieval stations of this type have the optically projected image appear on a rear projection screen. The optical path for the electronically scanned image will be separate and distinct from the viewing path. As a result, alignment of the two paths is difficult, and any error in such alignment will result in slightly different images being projected along each path. Thus, in the event one wanted to enlarge or zoom in on a portion of the image and then scan that same section, the misalignment that may exist could be intolerable.

Another problem with a rear projection viewing screen is that it is difficult to provide sufficient light to make the screen image bright enough and still maintain a pleasing contrast ratio for viewing in a normal office environment. Moreover, as the level of illumination on the screen approaches a satisfactory level of brightness, there may be more illumination than required for the linear scanning array.

After viewing an optically formed image on a screen, an operator may desire to scan just a Portion of that image. Present microfilm retrieval station require either the use of an optical mask or inputting the coordinates of the desired portions of the image to be scanned. Such procedures are not very productive because of the ungainly and complicated steps that must be performed by the operator.

DISCLOSURE OF THE INVENTION

It is therefore an object of the present invention to provide an improved optical scanning system for film image retrieval and scanning apparatus.

This and other objects are accomplished according to the present invention, which is directed to an electronic scanning apparatus having a film plane, including means for orienting the medium at each of a plurality of image-projecting positions while the medium is supported in the film plane and a selected one of the plural images is illuminated by a light source, and means for projecting an image of the illuminated image. A beamsplitter mirror assembly is used to reflect a portion of the image light onto a two dimensional array of light sensitive elements and the remainder of the light onto a linear array of light sensitive elements. The output of the two dimensional array is used to put an image on a television like display for initially viewing the image for proper positioning of the image and adjusting for the proper exposure. Obviously, the resolution of the viewed image can be of much lower quality than that of the stored or processed image because the viewed image is used mainly only for positioning and exposure control purposes. The latter can be accomplished by selecting the sensitivity of the light sensitive elements in each of the arrays such that the output of a light sensitive element in one array can be used to predict the corresponding output of the light sensitive elements in the other array based on the selected sensitivities.

MODES OF CARRYING OUT THE INVENTION

Figure 1:
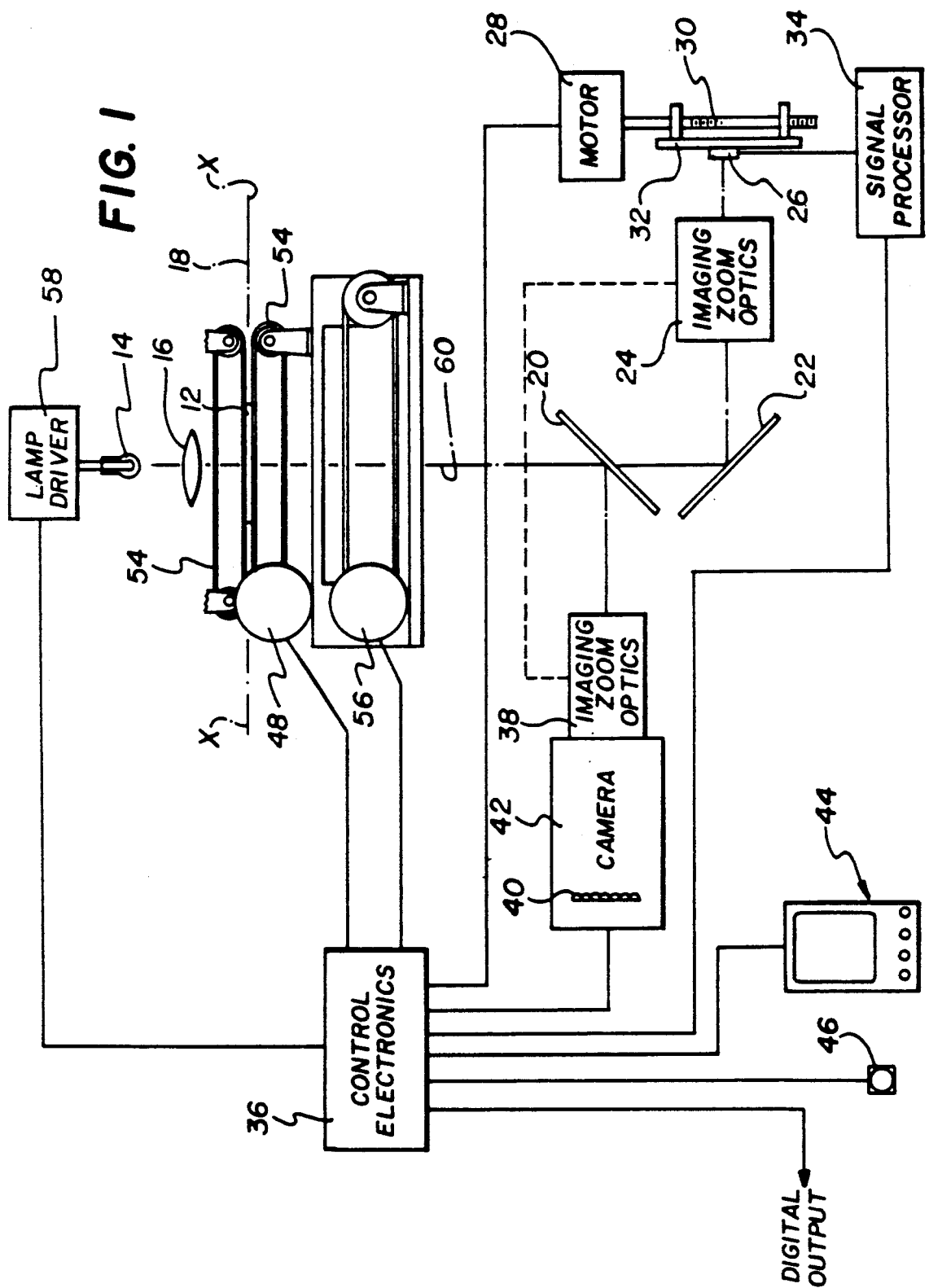
FIG. 1 is a schematic block diagram of the preferred embodiment of the present invention.
Figure 2:
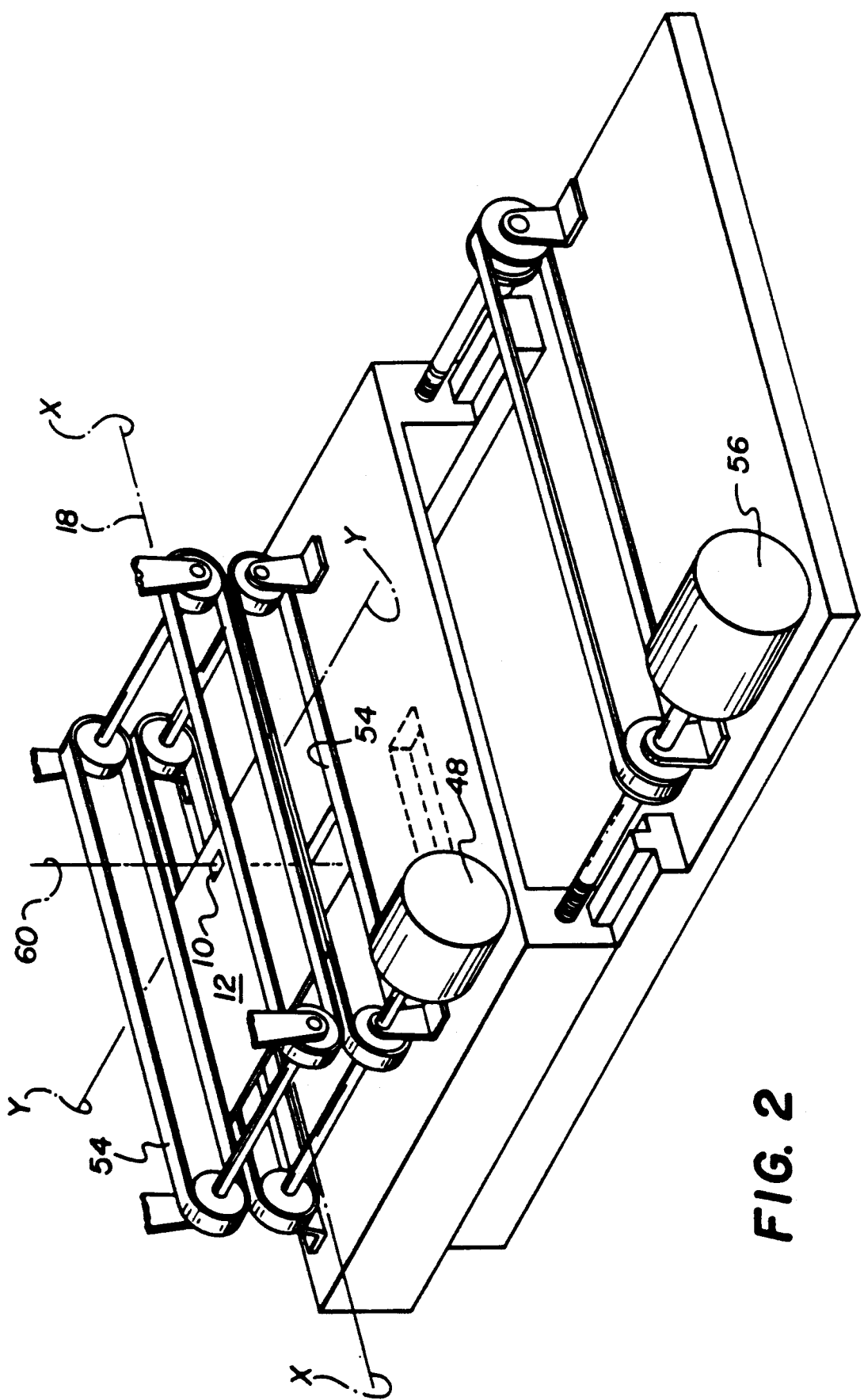
FIG. 2 is a schematic diagrammatic perspective view of the positioning mechanism shown in FIG. 1.

Now a preferred embodiment of the present invention will hereinbelow be described in detail with reference to FIGS. 1 and 2. A selected image 10 from a medium bearing plural images, such as a microfiche film 12 is scanned electronically for printing or storage on another medium. Light from a light source 14 passes through the condensing optics 16 and through image 10 on the film 12, which is located in a film plane 18. This image is projected through a partially reflecting or beam splitting mirror 20, then to a totally reflecting mirror 22, and then through imaging zoom optics 24 onto a line sensor array 26. The line sensor can be any type of linear electro-optical array, such as a Toshiba TCD 105C linear array. A motor 28 operating a lead screw arrangement 30 causes a stage 32 carrying line sensor 26 to move in the vertical direction over the image. The signal from line sensor 26 is passed through a signal processor 34 to a control electronics block 36. The signal processor performs a sample and hold operation on the data obtained from the sensor and then converts the analog data to a digital format prior to being sent to control electronics block 36. Image 10 is processed and/or stored here prior to being sent to a network (not shown) or used to make an electrophotographic print.

Some of the light from image 10 is reflected off the partially reflecting mirror 20 through imaging zoom optics 38 to a transducer 40 in a television camera 42. Transducer 40 contained in camera 42 can take the form of a CCD two dimensional array, photodiode array or a so-called vidicon tube. An appropriate transducer is found in a SONY® CCD B/W Video Camera Module-Model XC-77/77CE. Such an area array has 756 picture elements in the horizontal direction and 581 picture elements in the vertical direction, having a sensing area 8.8 mm×6.6 mm (0.35"×0.26"), which is the same as a ⅔-inch camera tube. It is important that the area have sufficient resolution to be able to identify documents captured on the film. Accordingly, it has been determined that a sensor with 756 by 581 pixels is sufficient. The signal from low resolution camera 42 is passed through control electronics block 36 to a video monitor 44 which is used as a viewfinder for the operator to ensure that the film is correctly positioned. To accomplish this, the operator can use a device such as a trackball (joystick or mouse) 46. Manipulation of trackball 46 allows the viewed image to be moved so that the correct frame is properly positioned and correctly framed in video monitor 44. As shown in FIG. 2, film 12 is moved in response to the operator's manipulation of trackball 46 which is connected via control electronics block 36 to drive motors 48 and 56a. Motor 48 moves the film 12 in the X direction by driving belts 54 and rubber belts or "O" rings 54, and the film is supported between motor 56 which moves the film in the Y direction by moving platen 52.

Continuous sampling of the video signal from camera 42 will provide adequate information concerning exposure control of the image and, by varying the lamp driver 58, the light intensity can be varied such that the least dense portion of the image does not quite saturate the sensor. Because the system is constructed so that the sensitivities of the sensors in each array 26 and 40 are identical, or at least have a known relationship to one another, the exposure level can be controlled as a function of the output of array 40 in the camera 42. Control electronics block 36 also analyzes the peak white level, the black level and statistical properties of the video signal, so as to process these properties to produce the most legible image from the information contained on the film 12. The same type of image processing is also applied to the video signal generated by linear array 26 to allow processing the video information in a single scan. Control electronics block 36 includes a computer capable of performing all of the needed signal processing functions for the video signals for both the area array 40 and line sensor array 26 as well as for controlling motors 48 and 56.

The system may be constructed such that imaging zoom optics 24 and 38 are coupled zoom lenses, allowing the operator to zoom the image by optically making it larger or smaller until the desired portion of the image is displayed. Because the zoom function in this instance, is optical rather than electronic, the resolution of the images formed on either of the sensor arrays 26 or 40 remains the same. This is a distinct advantage over electronic zooming which requires scaling functions to be performed, resulting in a loss of resolution in the zoomed image. Rather than using two coupled zoom lenses, a single zoom lens might be used between the film plane and the beam splitting element.

The imaging zoom optics 24, 38, associated with area sensor array 40 and line sensor array 26 are carefully aligned along their respective optical paths so that the image that appears on TV monitor 44 via the area array sensor 40 in TV camera 42 is exactly the same image or portion of an image that is projected onto the matrix portion of line sensor array 26. Accordingly, such pixel positioning on the area sensor has a corresponding point on the linear sensor matrix. Such an arrangement allows electronic blanking to be performed on the area image, resulting in the transfer of the blanking coordinates being transferred to the line sensor 26 matrix when the image is scanned. Trackball 46 may be used to automatically fix those coordinates prior to scanning with the line sensor array 26.

Advantages and Industrial Applicability

The present invention is useful in an image management system and more particularly, in micrographic systems that use microfiche. The present invention reduces the amount of time required in finding and verifying a particular image on film. In the past, when a line sensor array was used to scan an image, a trial scan was required to insure that the image was correctly and properly positioned, and that the exposure was correct. The present invention provides a "What you see is what you get" approach to the film scanning function. The real time exposure control and video pre-processing allows the correct signal processing to be performed on the data obtained from the linear scanner.

What is claimed is:

1. In an electronic scanning apparatus including means for projecting a selected image from a medium located in the film plane and bearing plural images, said apparatus including means for orienting the medium at each of a plurality of image-projecting positions, the improvement comprising:
    means for illuminating and projecting a selected one of said plural images;
    a two dimensional array of light sensitive elements have a first output;
    a linear array of light sensitive elements having a second output;
    means for directing at least a portion of the light of said selected image onto each array;
    display means for displaying the output of the two dimensional array for initially viewing said image; and
    selecting the sensitivity of the light sensitive elements in each of the arrays such that their sensitivity which corresponds to the amount of light falling thereon, is such that the output of a light sensitive element in one array can be used to predict the corresponding output of the light sensitive elements in the other array based on the selected sensitivities.

2. The apparatus as set forth in claim 1 wherein said first output is an analog signal.

3. The apparatus as set forth in claim 2 wherein said second output is a digital signal.

4. The apparatus as set forth in claim 1 wherein said medium is movable in orthogonal directions.

5. The apparatus as set forth in claim 1 wherein the output of said two-dimensional array is used to measure exposure and control said illuminating and projecting means.

6. The apparatus as set forth in claim 1 including zoom optics means in the optical path of each array in which said zoom optics means comprises two zoom lenses coupled together to move in synchronism with each other so as to provide the same magnification, with one zoom lens located in the respective path for said each array.

7. The apparatus as set forth in claim 1 wherein said linear array of light sensitive elements scans in a first direction and is movable in a second direction which is perpendicular to said first direction of scan.

8. The apparatus as set forth in claim 6 wherein; a zoom lens located in said first optical path has a lower magnification wherein said projected image substantially covers said two-dimensional array.

9. The apparatus as set forth in claim 8 wherein said zoom lenses further include a pair of servo motors coupled to respective zoom lenses to vary the magnification of the zoom lenses.

* * * * *